United States Patent
Nakajima

[19]

[11] Patent Number: 6,151,964
[45] Date of Patent: Nov. 28, 2000

[54] ANGULAR VELOCITY SENSING DEVICE

[75] Inventor: Fumio Nakajima, Tokyo, Japan

[73] Assignee: Citizen Watch Co., Ltd., Tokyo, Japan

[21] Appl. No.: 09/317,428

[22] Filed: May 24, 1999

[30] Foreign Application Priority Data

| May 25, 1998 | [JP] | Japan | 10-142745 |
| Jun. 25, 1998 | [JP] | Japan | 10-178512 |
| Jul. 8, 1998 | [JP] | Japan | 10-192579 |

[51] Int. Cl.[7] ............................................ G01P 9/04
[52] U.S. Cl. ............................................ 73/504.13
[58] Field of Search ............ 73/504.12, 504.13, 73/504.14

[56] References Cited

U.S. PATENT DOCUMENTS 5,226,321   7/1993   Varnham et al. .................... 73/504.13

FOREIGN PATENT DOCUMENTS 6-241815   9/1994   Japan .

OTHER PUBLICATIONS

"*Micro Structure Bulletin*"—Newsletter for Nordic Micro Structure Technology. vol. 4, No. 2—May 1996, J. Soderkvist, "50 Years with Quartz", pp. 1–8.

*Primary Examiner*—John E. Chapman
*Attorney, Agent, or Firm*—Armstrong, Westerman, Hattori, McLeland & Naughton

[57] ABSTRACT

The angular velocity sensing device is structured in such a manner that a first vibration element 1 having piezoelectric elements or electrodes (two or more) for generating oscillation and a second vibration element 2 having piezoelectric elements or electrodes (two or more) for sensing angular velocity are connected through first connection portions (two or more) on nodes of vibration (two or more) of the first vibration element 1, and the second vibration element 2 and a supporting portion are connected with each other through second connection portions (two or more). These first, second vibration elements, the supporting portion, and the first, second connection portions have a plane structure with almost uniform thickness, and both of the first vibration element and the second vibration element are made to have symmetric shapes with respect to the common center point P.

13 Claims, 15 Drawing Sheets

ANGULAR VELOCITY SENSING DEVICE

BACKGROUND OF THE INVENTION

1. Field of the Invention

The present invention relates to a vibration-type angular velocity sensing device used for navigation systems, attitude controls and the like for motorcars.

2. Description of the Related Art

Conventionally, an angular velocity sensing system using a mechanical rotor-based gyroscope has long been used as an inertial navigation system for an aircraft and a ship.

The mechanical rotor-based gyroscope is excellent in stability and performance but, on the other hand, it has disadvantages owing to its large size, high cost, and short life.

In recent years, in place of the mechanical rotor-based gyroscope, development of a vibration-type gyroscope using a vibration-type angular velocity sensing device for practical use has been proceeding.

The angular velocity sensing device comprises a long fine vibration body formed of a metallic material having constant elasticity such as elinvar, a piezoelectric element to drive the vibration body by applying AC voltage, and another piezoelectric element to detect the vibration which is in proportion to the angular velocity created by a Coriolis force induced by the rotational movement.

For instance, a vibration-type gyroscope using a vibration-type angular velocity sensing device is proposed in JP 6-241815 A. The outline thereof will be explained briefly with reference to FIG. 15 and FIG. 16.

The angular velocity sensing device shown in FIG. 15 and FIG. 16 is prepared as follows. Metallic material such as elinvar is shaped into a long regular triangular pillar to be served as a vibration body 91. Piezoelectric elements 92, 93 for driving and detecting respectively, and a piezoelectric element 94 for feedback are adhered at a middle point on each surface along the longitudinal direction of the regular triangular pillar. Supporting members 95 and 96 are welded onto nodes of vibration of the vibration body 91, and the whole angular velocity sensing device is held by fixing the supporting members 95 and 96 onto a base portion 97, as shown in FIG. 16.

In the angular velocity sensing device, the vibration body 91 is vibrated at its resonant frequency in the y-axis direction shown in FIG. 15 by applying AC voltage having the same frequency as the resonance frequency of the vibration body 91 to the piezoelectric elements 92 and 93 for driving and detecting of the vibration body, and to the piezoelectric element 94 for feedback thereof.

At this time, if the vibration body 91 receives a rotational angular velocity ω having a rotational axis in the z-axis direction, namely, in the direction of the length, a Coriolis force is induced in the x-axis direction, and the piezoelectric elements 92 and 93 develop voltages which are the same in magnitude but opposite in polarity.

By respectively applying the output voltages of the two piezoelectric elements 92 and 93 to two input terminals of a differential amplifier which is not shown in these figures, and then, eliminating the superposed AC voltage to leave the generated voltage alone, and furthermore, by performing synchronous detection using the resonance frequency, a detection signal in accordance with the magnitude of the angular velocity can be obtained.

However, such a conventional vibration-type angular velocity sensing device is said to have the following disadvantages.

First, since the whole angular velocity sensing device is held in a manner that the nodes of vibration of the vibration body in a triangular-pillar shape are welded to the supporting member at two points on the ridgeline portion, the shock-resistance characteristic thereof is low.

Second, since the supporting member needs to be welded accurately on the positions where the nodes of vibration of the vibration body are created, it requires considerably difficult work and many assembling processes. Accordingly, the price becomes expensive.

Third, since the axis of rotation of which angular speed is to be detected, takes in the direction of the length of the vibration body, the height in size of the whole angular velocity detecting element is determined by the length of the vibration body. Accordingly, reduction of the size is limited.

SUMMARY OF THE INVENTION

The present invention is developed to solve the disadvantages in such a conventional vibration-type angular velocity sensing device, and an object thereof is to provide an angular velocity sensing device which has an excellent shock-resistance, realizes the cost reduction, and enables a size reduction.

In order to achieve the above-described object, the angular velocity sensing device according to the present invention comprises a first vibration element having piezoelectric elements or electrodes for generating oscillation, a second vibration element having piezoelectric elements or electrodes for sensing angular velocity, a supporting portion, first connection portions to connect nodes of vibration of the first vibration element with the second vibration element, and second connection portions to connect the second vibration element with the supporting portion. The above-described first and second vibration elements, the supporting portion, and the first and second connection portions have plane structures with nearly the same thickness, and both the above-described first and second vibration elements are symmetrical about the common center point.

The above-described first and second vibration elements are preferably formed in a concentric ring-shape. The first vibration element is disposed in the inside of the second vibration element and the supporting portion is disposed in the outside of the second vibration element, or the first vibration element may be disposed in the outside of the second vibration element and the supporting portion may be disposed in the inside of the second vibration element.

The above-described first and second vibration elements may be formed with metal or silicon or with a single crystal showing piezo-electricity.

As the single crystal showing the piezo-electricity, any one of a quartz single crystal, a lithium tantalate single crystal, and a lithium borate single crystal can be used.

The whole angular velocity sensing device, namely the above-described first and second vibration elements, the supporting portion and the first and second connection portions can be integrally formed with the same material (any one of the above-described materials).

The above-described first and second vibration elements can be formed with a single crystal showing piezo-electricity, wherein the first vibration element is made in a ring-shape, which has electrodes for oscillation on antinode portions of the vibration, and the second vibration element is made in a ring-shape, which has electrodes for sensing angular velocity on positions corresponding to the electrodes for the oscillation in the first vibration element.

The ring-shaped first vibration element and the second vibration element, the first and second connection portions, and the supporting portion can be integrally formed with a single crystal showing piezo-electricity.

Another angular velocity sensing device according to the present invention can also be provided with a first vibration element having piezoelectric elements or electrodes for generating oscillation, a second vibration element having piezoelectric elements or electrodes for sensing angular velocity, a third vibration element, a supporting portion to support the first vibration element or the second vibration element, connection portions to connect the nodes of vibration of the first vibration element together with the second vibration elements, and connection portions to connect the second vibration element together with the third vibration element.

Even in this case, the above-described first, second and third vibration elements, the supporting portion, and each of the connection portions have plane structures with nearly uniform thickness, and each of the first, second and third vibration elements is symmetrical shape with respect to the common center point.

It is preferable to integrally form the first, second, and third vibration elements, the supporting portion, and first and second connection portions with the same material.

Furthermore, each of the first, second, and third vibration elements are preferably formed in a concentric ring-shape.

The first, second, and third vibration elements, the supporting portion, he first and second connection portions can be integrally formed with a ingle crystal quartz Z-plate.

The first vibration element and the second vibration element are respectively disposed on the positions symmetrical with respect to the y-axis of the single crystal quartz Z-plate, so as to form as a ring-shaped vibration element having the electrode for generating oscillation and a ring-shaped vibration element having the electrode for sensing the angular velocity.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, embodiments of the present invention will be explained concretely with reference to the drawings.

First Embodiment: FIG. 1 to FIG. 4D

First, a first embodiment of an angular velocity sensing device according to the present invention will be explained with reference to FIGS. 1 through 4D.

Figure 1:
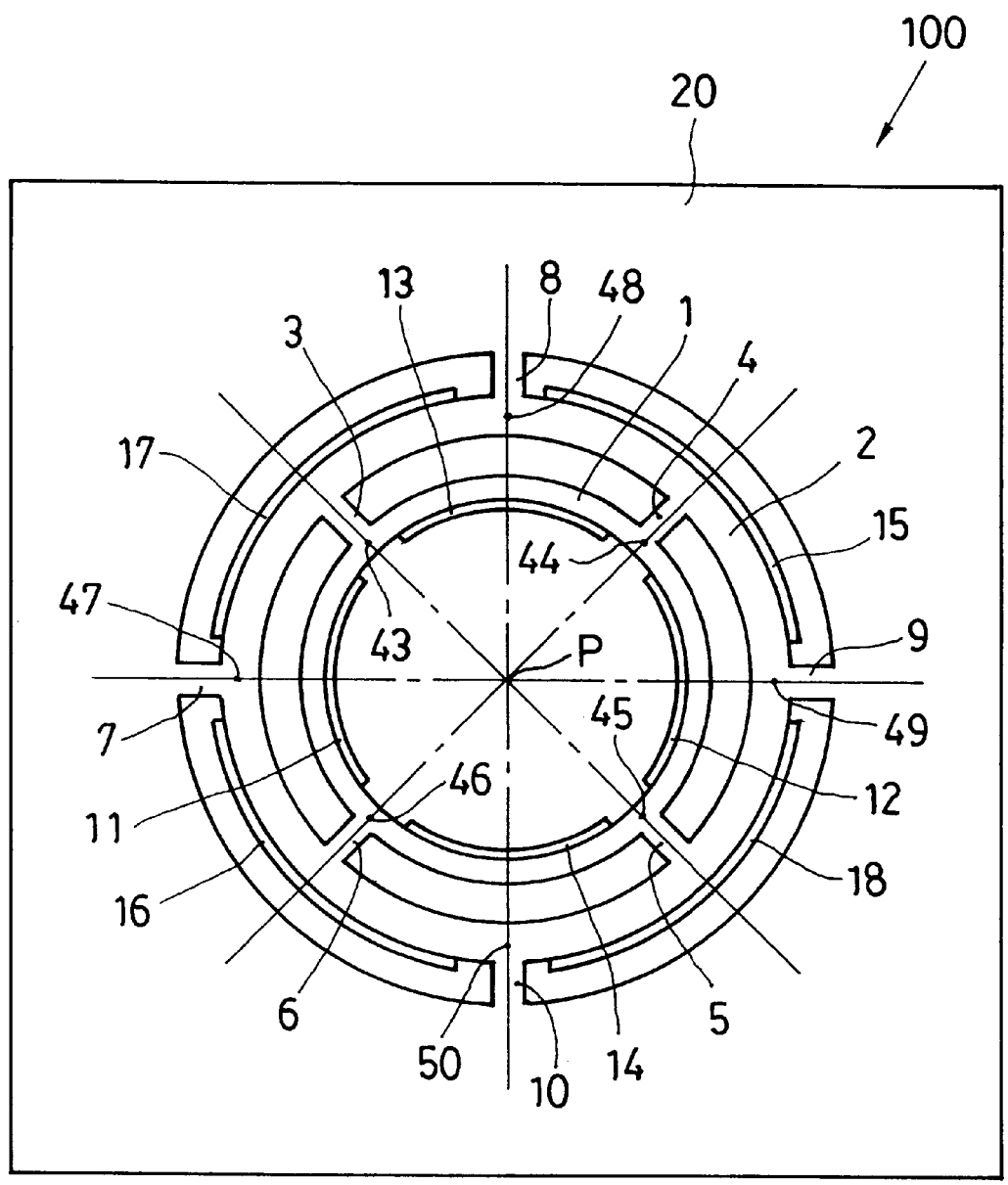
FIG. 1 is a plane view showing a structure of a first embodiment of an angular velocity sensing device according to the present invention.
Figure 2:
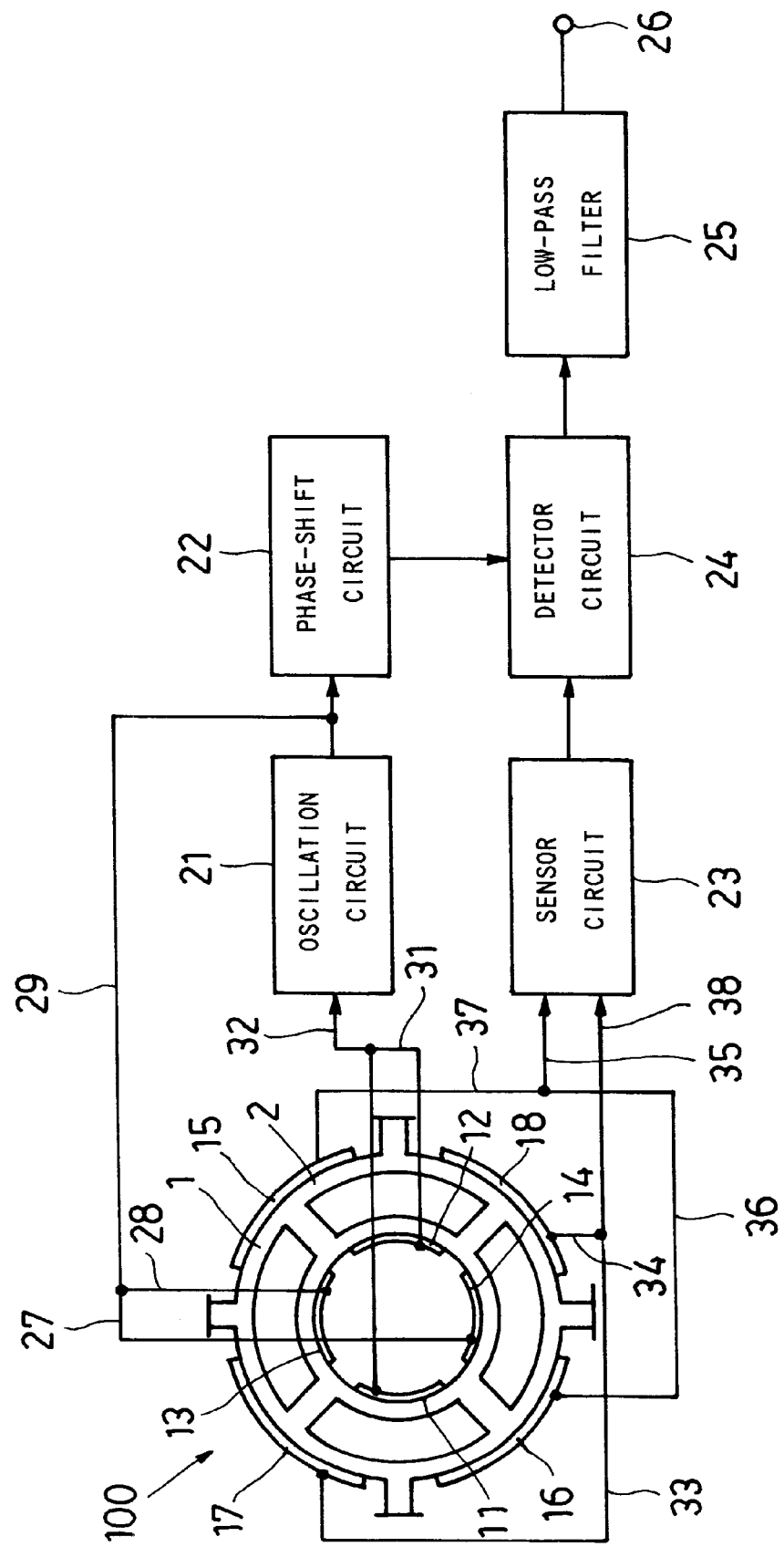
FIG. 2 is a block diagram of an angular velocity sensing system using the angular velocity sensing device shown in FIG. 1.

FIG. 1 is a plane view showing a structure of the angular velocity sensing device, FIG. 2 is a block diagram of an angular velocity sensing system using the angular velocity sensing device, FIGS. 3A to 3D are explanatory views showing a vibration state of a first vibration element of the angular velocity sensing device, and FIGS. 4A to 4D are explanatory views showing vibration states of the first vibration element and a second vibration element when the angular velocity sensing device receives a rotational angular velocity.

In each drawing except FIG. 2, four radial alternate long and short dashed lines passing through the center point P are drawn to pass through each center of the nodes and antinodes of the first vibration element 1 at intervals of 45° angles.

The angular velocity sensing device 100 shown in FIG. 1 comprises the first vibration element 1, the second vibration element 2, a supporting portion 20, first connection portions 3 to 6 which connect the nodes of vibration of the first vibration element 1 with the second vibration element 2, second connection portions 7 to 10 which connect the second vibration element 2 with the supporting portion 20.

The first and second vibration elements 1 and 2, the supporting portion 20, the first and second connection portions 3 to 10 have a plane structure with almost uniform thickness, and each of the first vibration element 1 and the second vibration element 2 is symmetric with respect to the point P which is a common center point for both vibration elements. In the present embodiment, the first vibration element 1 and the second vibration element 2 are formed in a concentric ring-shape. The shape is not limited to a circular ring-shape, but it may be in a shape of an endless frame such as a square or an ellipse, or either one of the vibration elements may be a plate having a disc shape or the like.

The angular velocity sensing device 100 is structured in a manner that the first and second vibration elements 1 and 2, the first and second connection portions 3 to 10 are integrally formed with the supporting portion 20 by means of a chemical treatment such as wet etching or dry etching with the same material for a supporting portion 20 having the outside shape of a square.

As the component material, metallic material such as elinvar which has an excellent temperature characteristic, a silicon substrate, or a quartz single crystal, lithium tantalate single crystal, or lithium borate single crystal which is a single crystal having piezo-electricity are used. Here, an embodiment using metallic material will be explained.

The first vibration element 1 is formed in the utmost inside, and is connected to the second vibration element 2 formed in the outside thereof, by the first connection portions 3, 4, 5 and 6 provided at the positions of the nodes of vibration, which are symmetrical with respect to the center point P. Four pieces of piezoelectric elements 11, 12, 13 and 14 for generating oscillation are adhered in an arc shape onto an inner peripheral surface of the antinode portions of vibration between each first connection portion of the first vibration element 1 at intervals of 90° angles.

The second vibration element 2 is formed in the outside of the first vibration element and is connected to the supporting portion 20 in the outside thereof, through the second connection portions 7, 8, 9 and 10, which are provided at the positions of 45° turn from those of the first connection portions 3, 4, 5, and 6, and are symmetric with respect to the center point P. By taking a symmetric four-point-support structure, the shock resistance is improved.

Four pieces of piezoelectric elements 15, 16, 17, and 18 for sensing angular velocity are adhered in an arc shape onto the outside peripheral surface between each second connection portion of the second vibration element 2.

As shown in FIG. 2, a pair of each opposing piezoelectric element 11 and 12 among the piezoelectric elements 11 to 14 for generating oscillation which are provided on the first vibration element 1 of the angular velocity sensing device 100, is connected to an input lead 32 of an oscillation circuit 21 through respective leading leads 30 and 31, the other opposing pair of the piezoelectric elements 13 and 14 is connected to an output lead 29 of the oscillation circuit 21 through respective leading leads 28 and 27.

The first vibration element 1 is vibrated in a resonance mode by the piezoelectric elements 11 to 14 for generating oscillation and the oscillation circuit 21, so that respective points 43, 44, 45 and 46 near the first connection portions 3 to 6 shown in FIG. 1 become nodes of the vibration.

On the other hand, a pair of opposing piezoelectric elements 15 and 16 among the piezoelectric elements 15 to 18 for sensing the angular velocity, provided on the second vibration element 2 of the angular velocity sensing device 100, are connected to a first input lead 35 of a sensor circuit 23 through respective leading leads 37 and 36. The other opposing pair 17 and 18 of the piezoelectric elements is connected to a second input lead 38 of the sensor circuit 23 through respective leading leads 33 and 34. In the second vibration element 2, respective points 47, 48, 49 and 50 near the second connection portions 7 to 10 shown in FIG. 1 become nodes of the vibration.

An output from the sensor circuit 23 becomes a first input to a detector circuit 24, an output from the oscillation circuit 21 becomes an input to a phase-shift circuit 22, and an output of the phase-shift circuit 22 becomes a second input to the detector circuit 24. An output of the detector circuit 24 is inputted to a low pass filter 25, and voltage which is proportional to the angular velocity is outputted from an output terminal 26 of the low pass filter.

The operation of the angular velocity sensing device 100 thus structured will be explained next.

The first vibration element 1 of the angular velocity sensing device 100 is vibrated by the piezoelectric elements 11 to 14 and the oscillation circuit 21, and flectionally oscillates in the plane so that respective points 3 to 6 shown in FIG. 1 become nodes of the vibration. The resonance frequency f0 at this time can be obtained from the following equation.

$$f0 = \alpha n, m / 2\pi a \sqrt{E/\rho(1-\sigma^2)}$$

Wherein αn, m are resonance frequency constants, n is the order of periphery, and m is the order of vibration. Here, a mode of n=2, m=1 is used. The value of α2, 1 at this time is determined by the ratio b/a of the outer radius a and the inner radius b of the first vibration element 1.

For instance, when b/a is 0.9, the α2, 1 is 0.17118. Incidentally, E represents Young's modulus, ρ density and σ poisson's ratio.

Figure 3A:
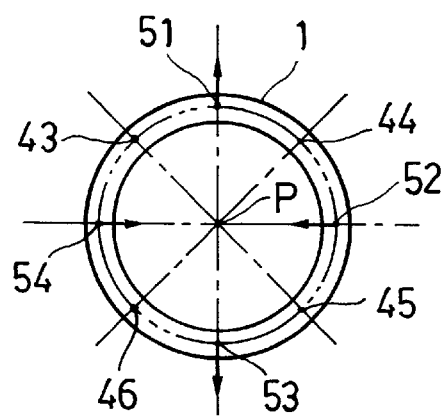
FIGS. 3A, 3B, 3C and 3D are explanatory views showing a vibration state of a first vibration element of the angular velocity sensing device shown in FIG. 1.

One vibration cycle of the first vibration element 1 shifts between four states as shown in FIG. 3A to FIG. 3D. In the first state, the shape of the first vibration element 1 is a perfect circle as shown in FIG. 3A. At this time, when the piezoelectric elements 11 to 14 are driven by the output of the oscillation circuit 21, in a manner that a force toward the outside is applied to the antinode points 51 and 53 of the vertical vibration of the first vibration element 1, and a force toward the inside is applied to the antinode points 52 and 54 of the horizontal vibration, which are shifted 90° from the points 51 and 53, then the first vibration element 1 shifts into the second state.

Figure 3B:
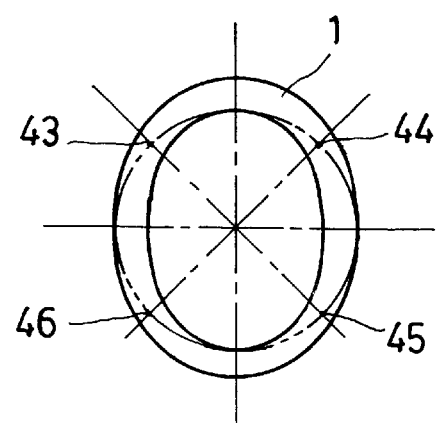

In the second state, the first vibration element 1 takes an elliptical shape expanding vertically and shrinking horizontally, as shown in FIG. 3B. At this time, since the points 43 to 46 are nodes of the vibration, they do not receive any deformation. Accordingly, since no force is transferred to the first connection portions 3 to 6, shown in FIG. 1, the second vibration element 2 does not receive any influence, nor does it vibrate.

Figure 3C:
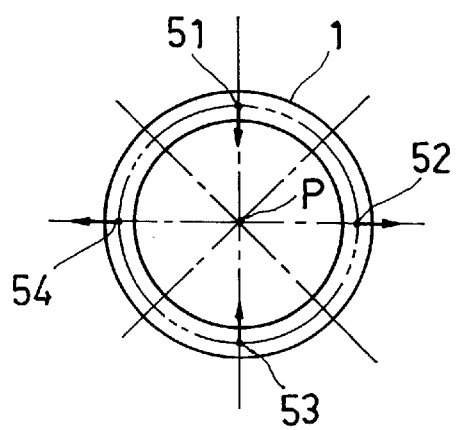

In the third state, the shape of the first vibration element 1 becomes a perfect circle again as shown in FIG. 3C. At this time, when the piezoelectric elements 11 to 14 are driven by the output of the oscillation circuit 21, in a manner that a force toward the outside is applied to the antinode points 52 and 54 of the horizontal vibration of the first vibration element 1, and a force toward the inside is applied to the antinode points 51 and 53 of the vertical vibration, then the first vibration element 1 shifts into the fourth state.

Figure 3D:
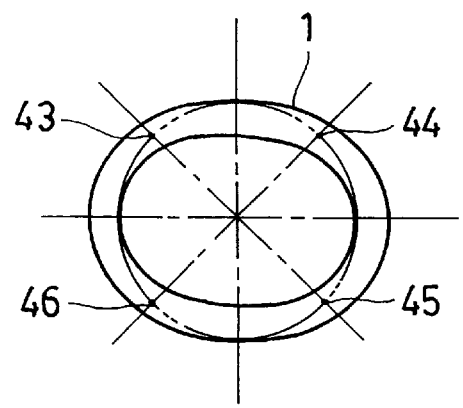

In the fourth state, the first vibration element 1 becomes an elliptical shape shrinking vertically and expanding horizontally, as shown in FIG. 3D. At this time, since the points 43 to 46 are nodes of the vibration, they do not receive any deformation. Accordingly, since no force is transferred to the first connection portions 3 to 6 shown in FIG. 1, the second vibration element 2 does not receive any influence, nor does it vibrates.

As above, even when the first vibration element 1 shifts between the above-described four states, since the second vibration element 2 does not receive any influence from the first vibration element 1, detecting voltage is not created at the piezoelectric elements 15 to 18 provided on the outer peripheral surface of the second vibration element 2. Accordingly, a sensor output is not generated while there is no rotation.

Next, the operation of the first vibration element 1 will be explained with reference to FIG. 4A to FIG. 4D when the first vibration element 1 receives a rotational angular velocity ω (shown by the arc-shaped arrow) around the rotational axis perpendicular to the paper surface of the drawings while the first vibration element 1 vibrates in the plane parallel to the paper surface of the drawings.

Figure 4A:
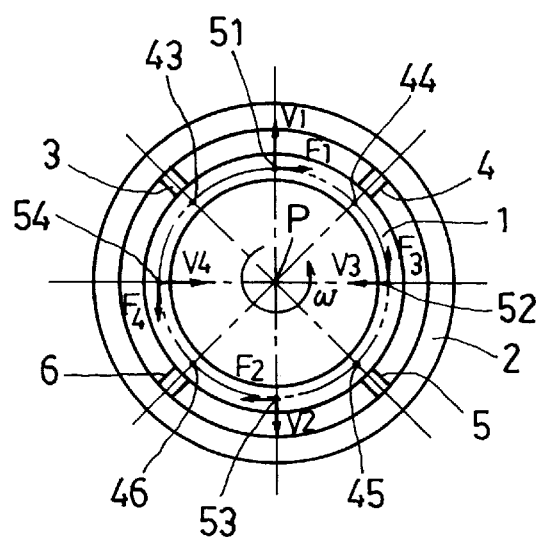
FIGS. 4A, 4B, 4C and 4D are explanatory views showing vibration states of the first vibration element and a second vibration element when the angular velocity sensing device shown in FIG. 1 receives a rotational angular velocity.

FIG. 4A is a view showing a state when the shape of the first vibration element 1 corresponding to FIG. 3A is a perfect circle. In this state, the antinode points 51 and 53 of the vertical vibration of the first vibration element 1 vibrates outward at a velocity of V1 and V2, and the antinode points 52 and 54 of the horizontal vibration thereof vibrates inward at a velocity of V3 and V4. Each velocity of the vibration under this circumstance reaches a maximum.

The velocity V1 and the velocity V2 are the same in magnitude and opposite in direction, and the velocity V3 and the velocity V4 are also the same in magnitude and opposite in direction. Coriolis forces F1, F3, F2 and F4 exert on the antinode points 51 to 54 of the vibration in the direction perpendicular to the velocity.

These Coriolis forces F1 to F4 are summed in vector, and they exert on the nodes of vibration of the first vibration element 1.

Figure 4B:
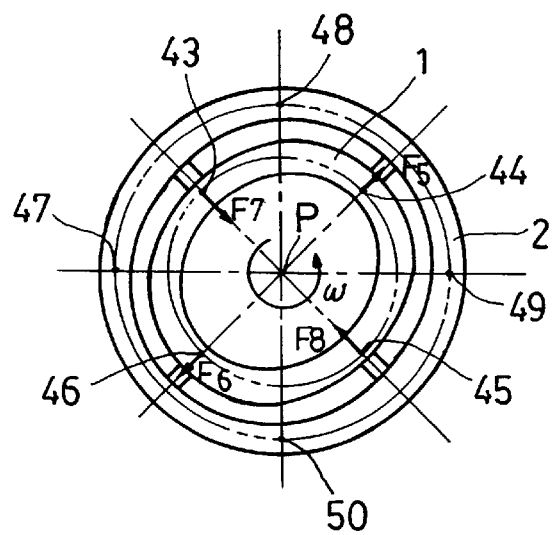

Consequently, as shown in FIG. 4B, outward forces F5 and F6 exert on the nodes 44 and 46 of the vibration, and inward forces F7 and F8 exert on the nodes 43 and 45 of the vibration. Then, the first vibration element 1 deforms into an elliptic shape in which a straight line connecting between a pair of nodes 44 and 46 serves as its long axis.

The second vibration element 2 connecting to the nodes of vibration of the first vibration element 1 receives composed Coriolis forces F5 to F8 together with the first vibration element through the first connection portions 3 to 6, and deforms into an elliptic shape whose long axis is in the same direction as in the case of the first vibration element.

A pair of the piezoelectric elements 15 and 16, shown in FIG. 1, adhered to the second vibration element 2, is deformed so as to expand together and generate sensor voltage Es. The other pair of the piezoelectric elements 17 and 18 is deformed so as to shrink together and generate sensor voltage −Es which is opposite in polarity to the sensor voltage of the piezoelectric elements 15 and 16.

Figure 4C:
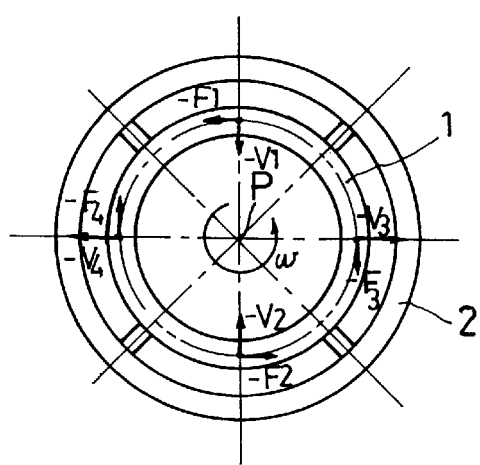

Further, FIG. 4C is a view showing a state when the shape of the first vibration element 1 corresponding to FIG. 3C is a perfect circle.

In this state, the antinode points 51 and 53 of the vertical vibration of the first vibration element 1 vibrate at inward velocity of −V1 and −V2, and the antinode points 52 and 54 of the horizontal vibration thereof vibrate at outward velocity of −V3 and −V4. Each velocity of the vibration under this circumstance reaches a maximum.

The velocity −V1 and the velocity −V2 are the same in magnitude and opposite in direction, and the velocity −V3 and the velocity −V4 are also the same in magnitude and opposite in direction. Coriolis forces −F1, −F3, −F2 and −F4 exert on the antinode points 51 to 54 of the vibration in the direction perpendicular to the velocity and opposite to those in FIG. 4A.

The Coriolis forces −F1 to −F4 are summed in vector, which exert on the nodes of vibration of the first vibration element 1.

Figure 4D:
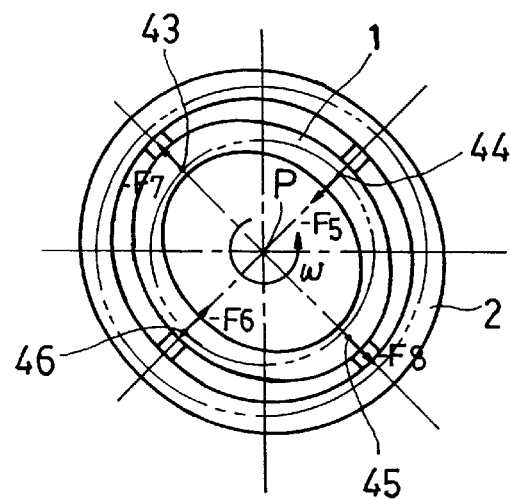

Consequently, as shown in FIG. 4D, inward force −F5 and −F6 exert on the nodes 44 and 46 of the vibration of the first vibration element 1, and outward force −F7 and −F8 exert on the nodes 43 and 45 of the vibration. Then, the first vibration element 1 deforms into an elliptic shape in which a straight line connecting between a pair of nodes 43 and 45 serves as its long axis.

The second vibration element 2 connecting to the nodes of vibration of the first vibration element 1 receives composed Coriolis forces −F5 to −F8 together with the first vibration element through the first connection portions 3 to 6, and deforms into an elliptic shape whose long axis is in the same direction as in the case of the first vibration element.

A pair of the piezoelectric elements 15 and 16 adhered to the second vibration element 2 is deformed so as to shrink together and to generate sensor voltage −Es. The other pair of the piezoelectric elements 17 and 18 are deformed so as to expand together and generate sensor voltage Es which is opposite in polarity to the sensor voltage of the piezoelectric elements 15 and 16.

The sensor voltages Es and −Es become one input and the other input to the sensor circuit 23 shown in FIG. 2 and are summed by a differential amplifier in the sensor circuit 23 to become an output 2Es. This output becomes a first input signal to a detector circuit 24, and is detected by a second input signal generated by output from a phase-shift circuit 22 which phase-shifts the output of the oscillation circuit 21 by 90° phase angles, and changes into a DC output proportional to the angular velocity through the low-pass filter 25.

Figure 5:
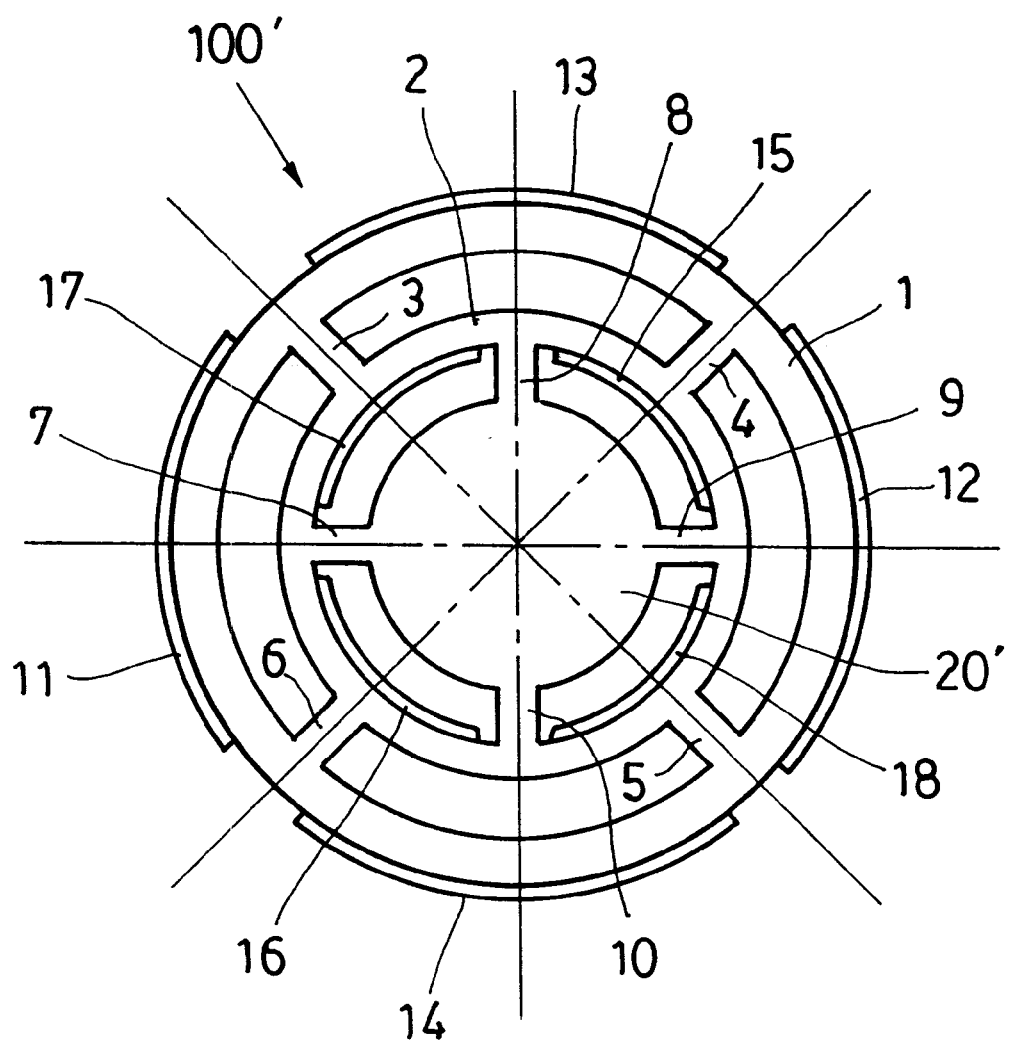
FIG. 5 is a plane view showing a structure in a second embodiment of the angular velocity sensing device according to the present invention.

Second Embodiment: FIG. 5

Next, a second embodiment of the angular velocity sensing device according to the present invention will be explained with reference to FIG. 5. FIG. 5 is the same plane view as FIG. 1 showing a structure of the angular velocity sensing device, and the same numerals and symbols are attached to the portions corresponding to those in FIG. 1.

In an angular velocity sensing device 100', a ring-shaped first vibration element 1 is disposed in the outside of a ring-shaped second vibration element 2, and a disc-shaped supporting portion 20' is disposed concentrically in the inside of the second vibration element 2. The nodes of vibration of the first vibration element 1 are connected to the second vibration element 2 at the respective first connection portions 3 to 6, and the supporting portion 20' and the second vibration element 2 are connected at the second connection portions provided at positions deviated from the positions of the first connection portions 3 to 6 by 45° angles.

Four pieces of piezoelectric elements 11 to 14 for generating vibration are adhered on the inner peripheral surface of the first vibration element 1, and four pieces of piezoelectric elements 15 to 18 for sensing angular velocity are adhered on the outer peripheral surface of the second vibration element 2 at the positions deviated from the positions of respective piezoelectric elements 11 to 14 of the first vibration element 1 by 45° angles.

Respective portions of the angular velocity sensing device 100' are integrally formed with the same metallic material as that of the angular velocity sensing device 100 in the first embodiment, and have a plane structure with almost uniform thickness.

Since vibration of the angular velocity sensing device 100' and the operation of the angular velocity detection are the same as those of the angular velocity sensing device 100 in the above-described first embodiment, the explanation thereof will be omitted.

In these embodiments, examples to form the angular velocity sensing device with metallic material have been explained, but as described hereinbefore, material to form the angular velocity sensing device is not limited to this, any single crystal showing piezo-electricity such as silicon, a quartz single crystal, a lithium tantalate single crystal, or a lithium borate single crystal can be used.

It should be noted that when the first and second vibration elements 1 and 2 are formed with a single crystal showing piezo-electricity, electrodes for generating oscillation can be formed on the first vibration element, and electrodes for sensing the angular velocity can be formed on the second vibration element 2, by vapor deposition or sputtering, in place of the piezoelectric elements 11 to 14 for generating oscillation and the piezoelectric elements 15 to 18 for sensing the angular velocity.

Figure 6:
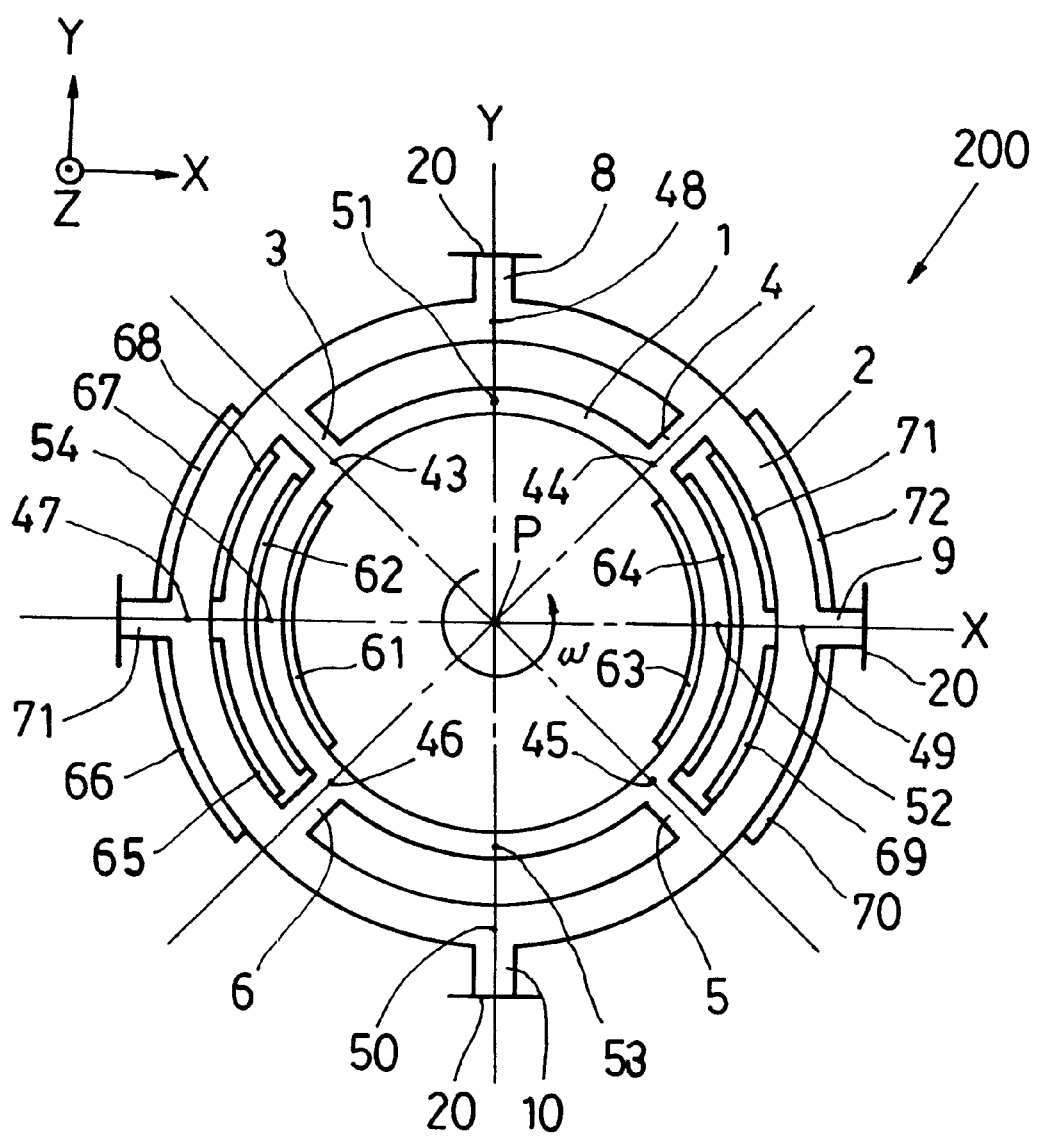
FIG. 6 is a plane view showing a structure in a third embodiment of the angular velocity sensing device according to the present invention.
Figure 7:
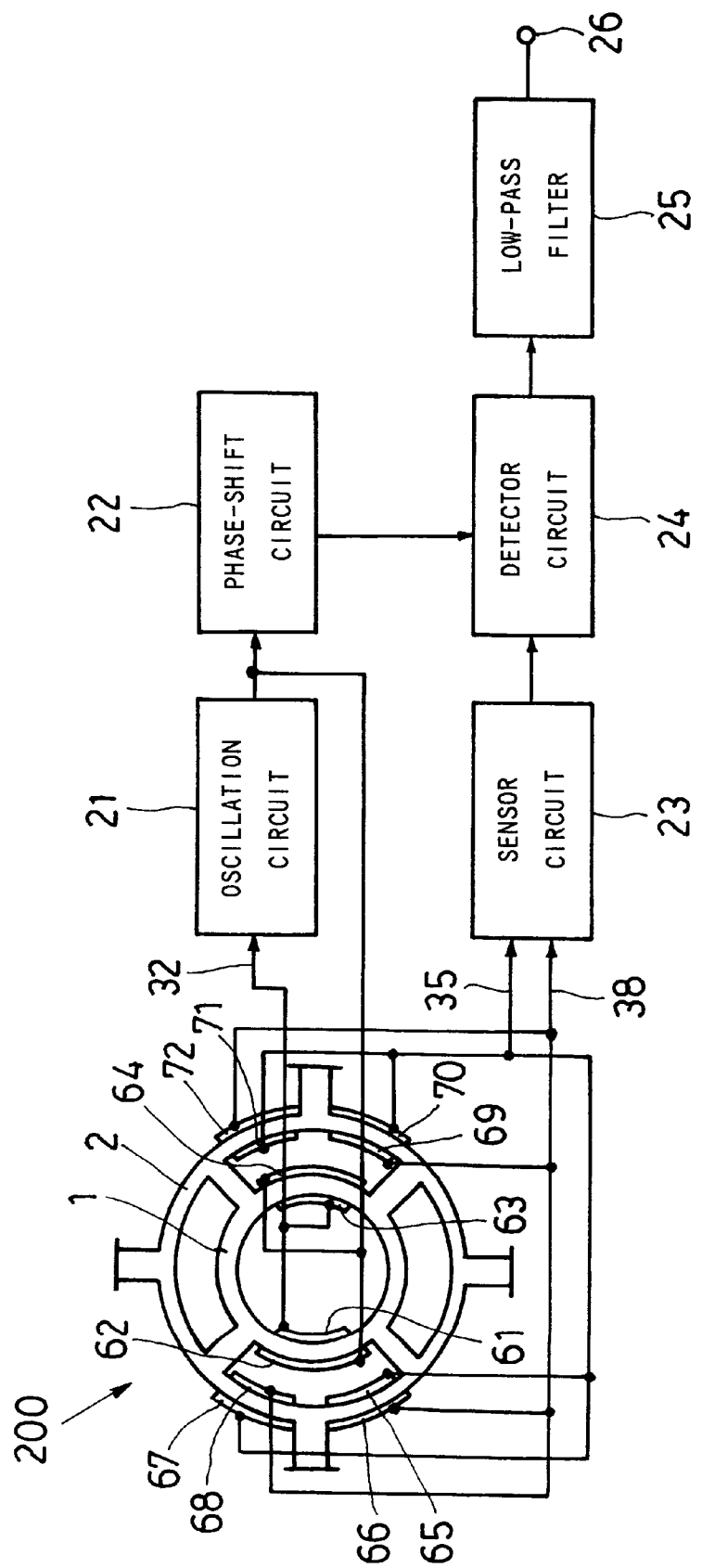
FIG. 7 is a block diagram of an angular velocity sensing system using the angular velocity sensing device shown in FIG. 6.

Third Embodiment: FIG. 6 and FIG. 7

The third embodiment of the angular velocity sensing device according to the present invention will be explained with reference to FIG. 6 and FIG. 7.

FIG. 6 is the same plane view as FIG. 1 showing a structure of the angular velocity sensing device, but its supporting portion is omitted showing therein. FIG. 7 is a block diagram of an angular velocity sensing system using the angular velocity sensing device. In these figures, the same numerals and symbols are attached to portions corresponding to the portions in FIG. 1 and FIG. 2.

In the angular velocity sensing device 200 shown in FIG. 6, a first vibration element 1 and a second vibration element 2, first connection portions 3, 4, 5 and 6 to connect nodes of vibration of the first vibration element 1 with the second vibration element 2, second connection portions 7, 8, 9 and 10 to connect the second vibration element 2 with the supporting portion 20, and the supporting portion 20 (not shown) form a plane structure with almost uniform thickness. It should be noted that the supporting portion 20 may be integrally formed so as to enclose the second vibration element 2 as in the embodiment shown in FIG. 1, or the supporting portion may be provided on respective second connection portions 7 to 10.

The angular velocity sensing device 200 is also formed from the same construction material by a chemical process such as dry etching, wet etching or the like.

As a construction material, quartz crystal, lithium tantalate, lithium borate or the like which has piezo-electricity in a single crystal state is used. Here, an example using a Z-plate of a quartz single crystal will be explained. The Z-plate of the quartz single crystal has a predetermined thickness in the Z-axis (optical axis) direction perpendicular to the paper surface shown in FIG. 6, the X-axis (electric axis) is put in the horizontal direction, and the Y-axis (mechanical axis) in the vertical direction.

The first vibration element 1 and the second vibration element 2 of the angular velocity sensing device 200 shown in FIG. 6 are formed in a concentric ring-shape, the first vibration element 1 is formed inside of the second vibration element and is connected to the second vibration element 2 by the first connection portions 3 to 6 provided at the positions symmetrical with respect to the center point P (positions near the node points of vibration 43 to 46 of the first vibration element 1). The vibration element 1 has four nodes and four antinodes of vibration.

Electrodes 61 and 62 for generating oscillation are respectively provided by vapor deposition on the inner peripheral surface and the outer peripheral surface of the antinode portion of vibration between the first node 43 and the fourth node 46 of the first vibration element 1. Electrodes 63 and 64 for generating oscillation are also respectively provided by vapor deposition on the inner peripheral surface and the outer peripheral surface of the antinode portion of vibration between the second node 44 and the third node 45. Each of the electrodes 61 to 64 intersects the X-axis (electric axis) of the quartz crystal at right angles and is almost in parallel with the Y-axis (mechanical axis).

As shown in FIG. 7, the electrodes 61 and 63 for generating oscillation are connected with an input lead 32 of an oscillation circuit 21 by a connection lead. The electrodes 62 and 64 for generating oscillation are connected with an output lead 29 of the oscillation circuit 21 through a connection lead.

The first vibration element 1 is vibrated by these electrodes 61 to 64 for generating the oscillation and the oscillation circuit 21 in a resonance mode in which points near the connection portions 3 to 6 are to be nodes of the vibration 43, 44, 45 and 46.

The ring-shaped second vibration element 2 is formed in the outside of the first vibration element 1 and is connected to the supporting portion 20 through the second connection portions 7 to 10 provided at positions which are symmetrical with respect to a point and obtained by turning the first connection portions 3 to 6 by 45 degrees.

Electrodes 65, 68 and 66, 67 for sensing the angular velocity are formed on the second vibration element 2 in the corresponding portions adjacent to the electrodes 61 and 62 for generating oscillation on the first vibration element 1. Electrodes 69, 71 and 70, 72 for sensing the angular velocity are formed in the corresponding portions adjacent to the electrodes 63 and 64 for generating oscillation on the first vibration element 1.

The electrodes 65 to 72 which are respectively separated near the corresponding supporting portions 7 and 9, intersect the X-axis (electric axis) of the quartz crystal at right angles, and are almost in parallel with the Y-axis (mechanical axis).

As shown in FIG. 7, the electrodes 67, 65, 71 and 70 are commonly connected to a first input lead 35 of the sensor circuit 23 through a connection lead. The electrodes 68, 66, 72 and 69 are commonly connected by a connection lead to a second input lead 38 of the sensor circuit 23. In the second vibration element 2, points near the connection portions 7 to 10 are to be nodes of vibration 47, 48, 49 and 50.

The function of the oscillation circuit 21, a phase-shift circuit 22, the sensor circuit 23, a detector circuit 24 and a low-pass filter 25 are the same as those in the case of the first embodiment explained with FIG. 2. When the angular velocity sensing device 200 receives an angular velocity ω rotating around an axis perpendicular to the paper surface as shown by the curved arrow in FIG. 6, voltage which is proportional to the angular velocity is outputted to the output terminal 26 of the low-pass filter 25.

The principle of operation of the angular velocity sensing device 200 is similar to that of the above-described angular velocity sensing device 100 in the first embodiment, which is explained with FIG. 3A to FIG. 3D and FIG. 4A to FIG. 4D.

However, when the second vibration element 2 is deformed into an elliptic shape by a Coriolis force, the portions where the electrodes 65, 66 and 71, 72 for sensing angular velocity are formed expand, and the portions where the electrodes 67, 68 and 69, 70 for sensing angular velocity are formed contact and vice versa, and positive and negative detecting charges Qs are generated.

The positive and negative detecting charges Qs are converted into output voltage Es through a current-voltage conversion circuit in the sensor circuit 23. The subsequent signal treatment is the same as that in the first embodiment explained with FIG. 2

In the third embodiment, similar to the angular velocity sensing device in the second embodiment shown in FIG. 5, the ring-shaped first vibration element 1 may be disposed in the outside of the ring-shaped second vibration element 2, and the concentric disc-shaped supporting portion may be disposed in the inside of the second vibration element 2.

An example in which a Z-plate of a quartz single crystal is used as a component material of the angular velocity sensing device is explained, but as described hereinbefore, another single crystal material having piezo-electricity such as a lithium tantalate single crystal, or a lithium borate single crystal can be used as the component material. Furthermore, metal such as elinvar or a silicon substrate can be used. In such cases, a piezoelectric element for generating oscillation may be adhered to the first vibration element 1, and a piezoelectric element for sensing angular velocity may be adhered to the second vibration element 2.

Fourth Embodiment: FIG. 8 to FIG. 14B

Next, a fourth embodiment of the angular velocity sensing device according to the present invention will be explained with reference to FIG. 8 to FIG. 14B.

Figure 8:
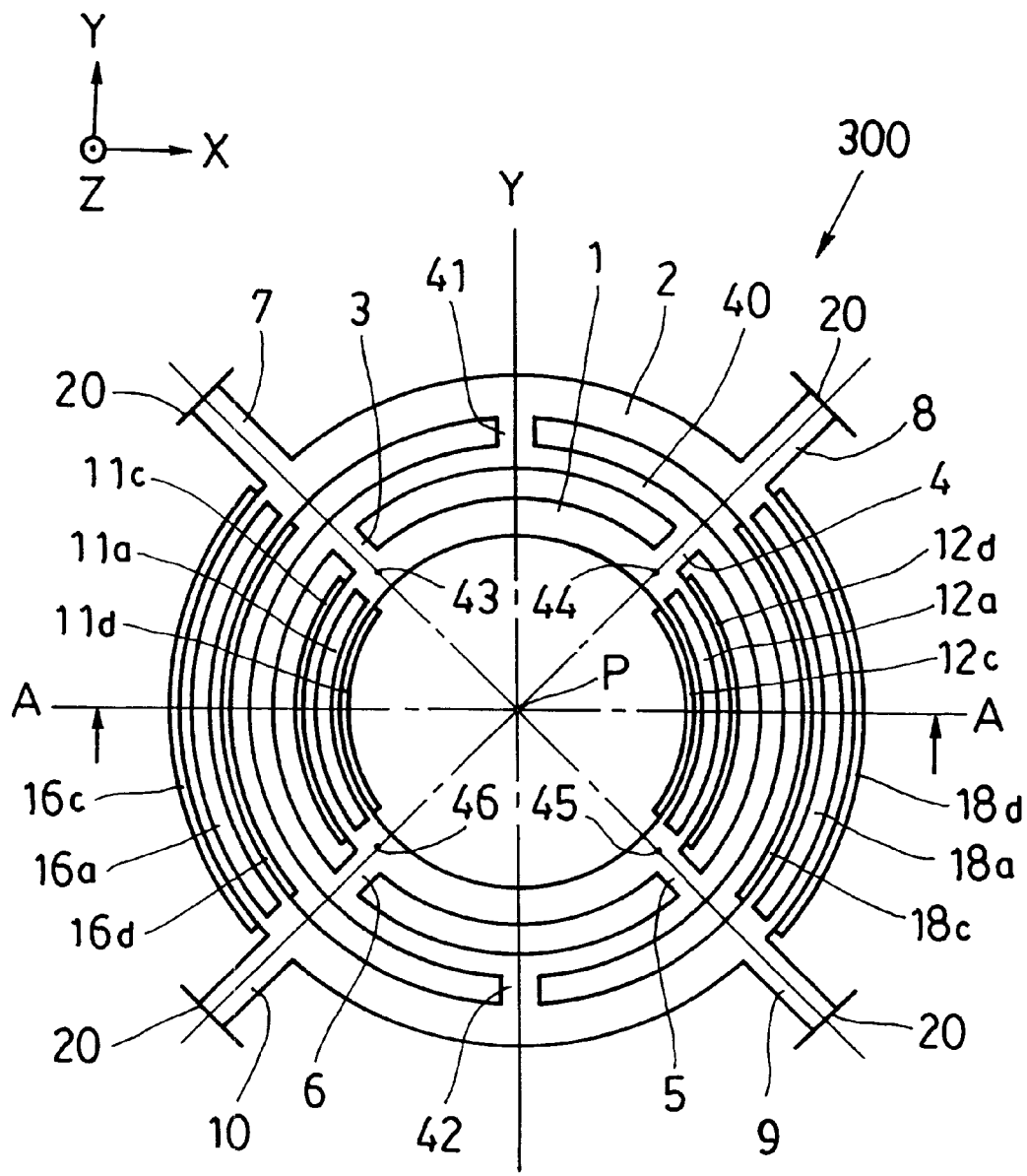
FIG. 8 is a plane view showing a structure in a fourth embodiment of the angular velocity sensing device according to the present invention.
Figure 9:
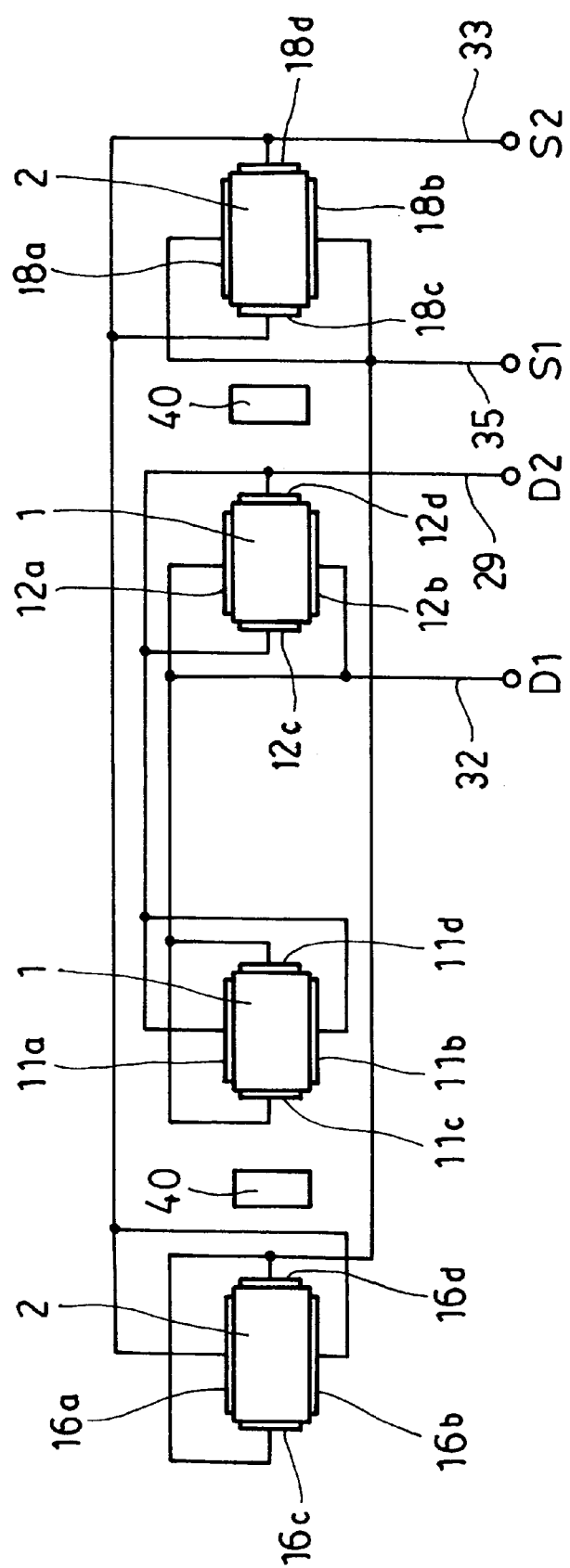
FIG. 9 is a schematic enlarged sectional view of a cutting plane taken along the line A—A of FIG. 8 to show the relationships of connections between respective electrodes of the angular velocity sensing device shown in FIG. 8.
Figure 10:
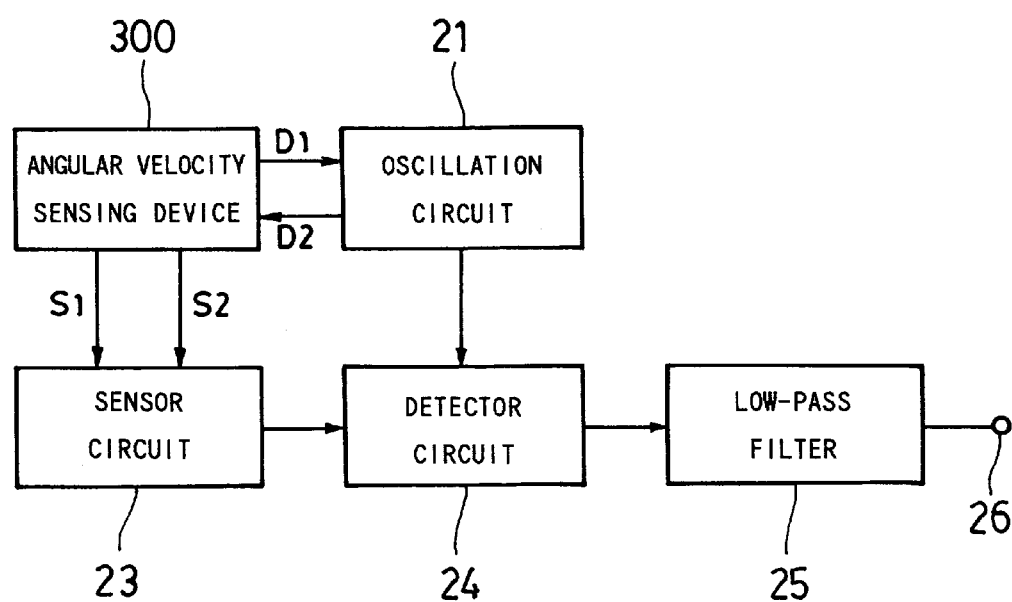
FIG. 10 is a block diagram of an angular velocity sensing system using the angular velocity sensing device shown in FIG. 8 and FIG. 9.

FIG. 8 is a plane view similar to FIG. 1 showing the structure of the angular velocity sensing device, and the pictorial representation of the supporting portion will be omitted. FIG. 9 is a schematic enlarged end view of a cut surface along the line A—A in FIG. 8 which is a view for showing the relation of each electrode connection in the angular velocity sensing device and FIG. 10 is a block diagram of an angular velocity sensing system using the angular velocity sensing device. In these figures, the same numerals and symbols are attached to the portions corresponding to those in FIG. 1 and FIG. 2.

An angular velocity sensing device 300 shown in FIG. 8 is integrally formed from the same component material by chemical treatment such as dry etching or wet etching and has a plane structure having almost uniform thickness all over the structure.

As a component material, a quartz crystal plate which have piezo-electricity in a single crystal state, or a silicon substrate, or metallic material such as elinvar which has a good temperature characteristic, are used. Here, similar to the third embodiment, an example in which a single crystal quartz Z-plate is used will be explained.

The single crystal quartz Z-plate has a predetermined thickness in the Z-axis (optical axis) direction perpendicular to the paper surface shown in FIG. 8, and the X-axis (electric axis) is set in the horizontal direction and the Y-axis (mechanical axis) is set in the vertical direction.

As shown in FIG. 8, the angular velocity sensing device 300 in the present embodiment is provided with a concentric ring-shaped first vibration element 1, second vibration element 2 and third vibration element 40 using the center point P as a common center.

The first vibration element 1 is formed in the utmost inside and is connected to the third vibration element 40 in the outside thereof through the first connection portions 3, 4, 5 and 6 which are provided at positions symmetric with respect to the center point P.

The third vibration element 40 is connected to the outermost second vibration element 2 through third connection portions 41, 42 which are provided at two points in the Y-axis direction.

The second vibration element 2 is connected to the supporting portion 20 which is in the outside of second connection portions through the second connection portions 7, 8, 9 and 10 which are provided on the angular positions respectively corresponding to the first connection portions 3, 4, 5 and 6. The supporting portion 20 which is omitted to show in the figure, may be formed integrally in the same way as the supporting portion 20 in the first embodiment shown in FIG. 1, or may be formed separately in respect to respective second connection portions 7, 8, 9 and 10.

As shown in FIG. 9 which is a schematic enlarged end view of a cut surface taken along the line A—A parallel to the X-axis direction in FIG. 8, electrodes for generating oscillation 11*a*, 11*b*, 11*c* and 11*d* are formed on the respective top, bottom, right and left surfaces of the arc portion where there is an antinode of vibration between the nodes of vibration 43 and 46 of the first vibration element 1. Electrodes for generating oscillation 12*a*, 12*b*, 12*c* and 12*d* are also formed on the respective top, bottom, right and left surfaces of the arc portion where there is an antinode of vibration between the nodes of vibration 44 and 45 of the first vibration element 1.

Electrodes for sensing angular velocity 16*a*, 16*b*, 16*c* and 16*d* are formed on the respective top, bottom, right and left surfaces of the arc portion between the second connection portions 7 and 10 of the second vibration element 2, and electrodes for sensing angular velocity 18*a*, 18*b*, 18*c* and 18*d* are formed on the respective top, bottom, right and left surfaces of the arc portion between the second connection portions 8 and 9.

All of the respective electrodes are symmetric with respect to the center point P, and are bilaterally symmetrical with respect to the Y-axis which passes through the center point P.

As shown in FIG. 9 and FIG. 10, the electrodes for generating oscillation 11*c*, 11*d* and 12*a*, 12*b* of the first vibration element 1 are connected with each other to connect with an input lead 32 (D1) of the oscillation circuit 21. The electrodes for generating oscillation 11*a*, 11*b* and 12*c*, 12*d* of the first vibration element 1 are connected with each other to connect with an output lead 29 (D2) of the oscillation circuit 21. The first vibration element 1 is vibrated in a resonance mode in which points near the connection portions 3 to 6 are to be nodes of vibration 43 to 46 by these electrodes for generating oscillation and the oscillation circuit 21.

The electrodes for sensing angular velocity 16*c*, 16*d* and 18*a*, 18*b* of the second vibration element 2 are connected with each other to connect with a first input lead 35 (S1) of the sensor circuit 23. The electrodes for sensing angular velocity 16*a*, 16*b* and 18*c*, 18*d* are connected with each other to connect with a second input lead 38 (S2) of the sensor circuit 23.

As shown in FIG. 10, the output of the sensor circuit 23 is inputted to the detector circuit 24 to perform detection in synchronization with the output of the oscillation circuit 21, and the detected output is inputted to the low-pass filter 25 to output voltage which is proportional to the angular velocity which the angular velocity sensing device 300 receives, on the output terminal 26. In this case, a phase-shift circuit in the circuit explained using FIG. 2 and FIG. 7 of the above-described respective embodiments is unnecessary.

Next, the principle of operation of the angular velocity sensing device 300 will be explained.

In respect that the first vibration element 1 of the angular velocity sensing device is driven by the electrodes for generating oscillation 11*a* to 11*d* and 12*a* to 12*d*, and the oscillation circuit 21, and performs flectional vibration in the plane at a resonance frequency of f0 so that the points 43, 44, 45 and 46 shown in FIG. 8 become nodes of vibration, it is similar to that in the above-described respective embodiments.

When the first vibration element 1 does not receive a rotational angular velocity, one vibration cycle of the first vibration element 1 passes four states shown in FIG. 3A, FIG. 3B, FIG. 3C and FIG. 3D (a perfect circle→an ellipse expanding vertically→a perfect circle→an ellipse expanding horizontally).

At this time, since the nodes of vibration 43, 44, 45 and 46 are not deformed, forces are not transferred to the first connection portions 3, 4, 5 and 6. Accordingly, the third vibration element 40 does not receive any effect, and does not vibrate.

Consequently, the second vibration element 2 connected to the third vibration element 40 does not receive any effect of vibration of the first vibration element 1, and a sensor charge does not occur in each electrode for detection on the second vibration element 2. Accordingly, any sensor output does not occur when there is no rotation.

Next, the operation of the first vibration element 1 will be explained with reference to FIG. 11A to FIG. 14B. When the first vibration element 1 receives a rotational angular velocity ω around the rotational axis perpendicular to the paper surface of the drawings, it vibrates in the plane parallel to the paper surface of the drawing in FIG. 8.

Figure 11A:
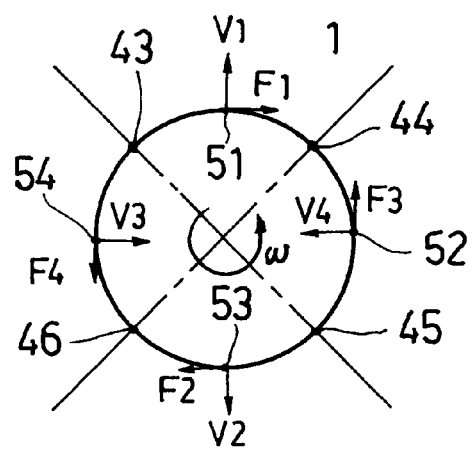
FIGS. 11A and 11B are explanatory views showing a first state of vibration when the angular velocity sensing device shown in FIG. 8 receives a rotational angular velocity.

The first state is at the time when the shape of the first vibration element 1 shown in FIG. 11A corresponding to FIG. 3A is a perfect circle. At this time, the antinodes of vibration 51 and 53 vibrate at an outward velocity V1 and V2, the antinodes of vibration 52 and 54 vibrate at an inward velocity V3 and V4, and the velocity of each vibration becomes a maximum under this state. The velocity V1 and V2 are the same in magnitude and opposite in direction, and the velocity V3 and V4 are also the same in magnitude and opposite in direction. Coriolis forces F1, F3, F2 and F4 exert on the antinodes of vibration 51, 52, 53 and 54 in the direction perpendicular to the velocity.

Figure 11B:
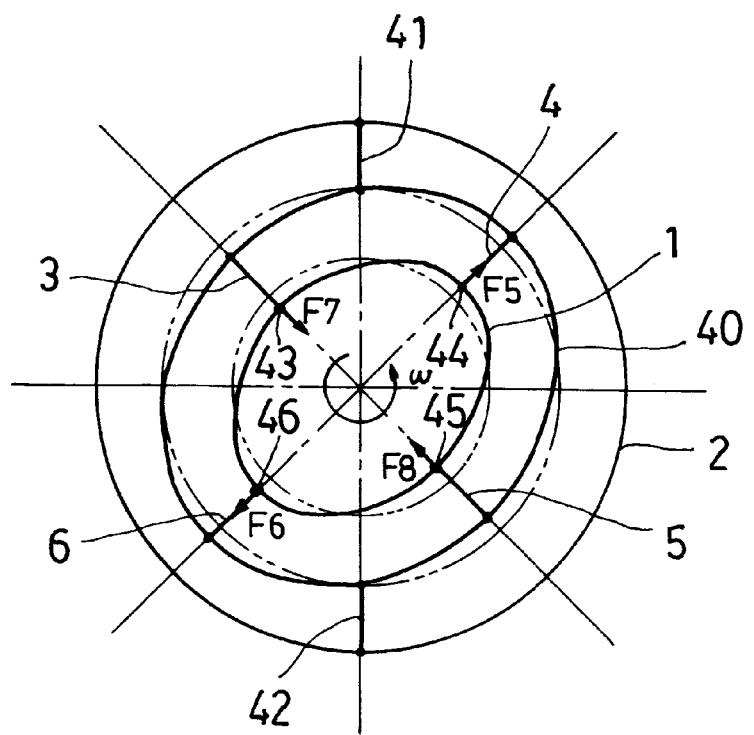

The Coriolis forces F1, F2, F3 and F4 are summed in vector and the summed forces exert on the nodes of vibration 43, 44, 45 and 46 of the first vibration element 1. As shown in FIG. 11B, outward forces F5 and F6 exert on the nodes of the vibration 44 and 46, inward forces F7 and F8 exert on the nodes of the vibration 43 and 45, and the first vibration element 1 deforms into an elliptic shape in which a straight line connecting between the nodes 44 and 46 serves as a long axis.

The third vibration element 40 connected to the nodes of vibration 43, 44, 45 and 46 of the first vibration element 1 receives the composed Coriolis forces F5, F6, F7 and F8 together with the first vibration element 1 through the first connection portions 3, 4, 5 and 6, and deforms into an elliptic shape in which the same direction as the first vibration element 1 serves as a long axis.

However, the second vibration element 2 which connects to the nodes of vibration of the third vibration element 40 through the connection portions 41 and 42 neither receives any effect of the vibration and it does not vibrate itself.

Figure 12A:
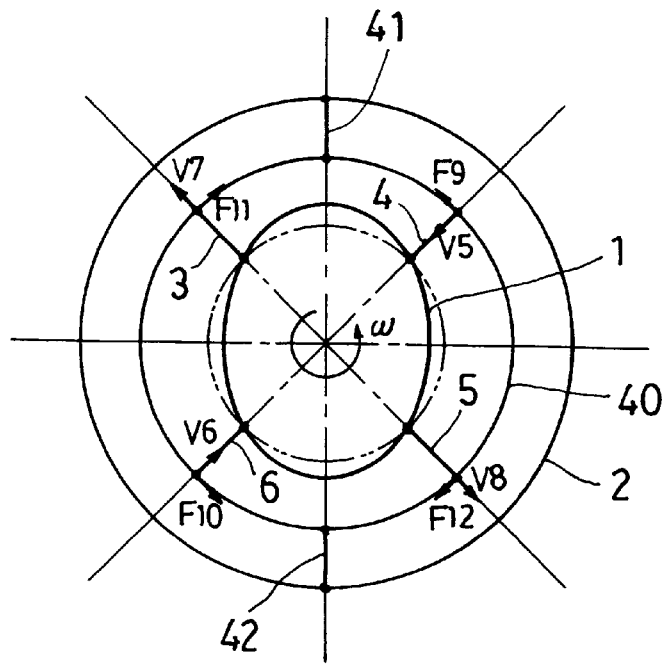
FIG. 12A and FIG. 12B are explanatory views showing a second state of the same as above.

Next, in the second state, as shown in FIG. 12A, displacement of the first vibration element 1 becomes a maximum in the vertical direction. At this time, the first connection portions 4 and 6 move at an inward velocity of V5 and V6, and the first connection portions 3 and 5 move at an outward velocity V7 and V8. The velocity V5 and the velocity V6 are the same in magnitude and opposite in direction, and the velocity V7 and the velocity V8 are also the same in magnitude and opposite in direction.

The respective portions corresponding to the nodes of vibration of the third vibration element 40 which connect to the first connection portions 3, 4, 5 and 6 move at the same velocity and receive Coriolis forces F9, F10, F11 and F12.

Figure 12B:
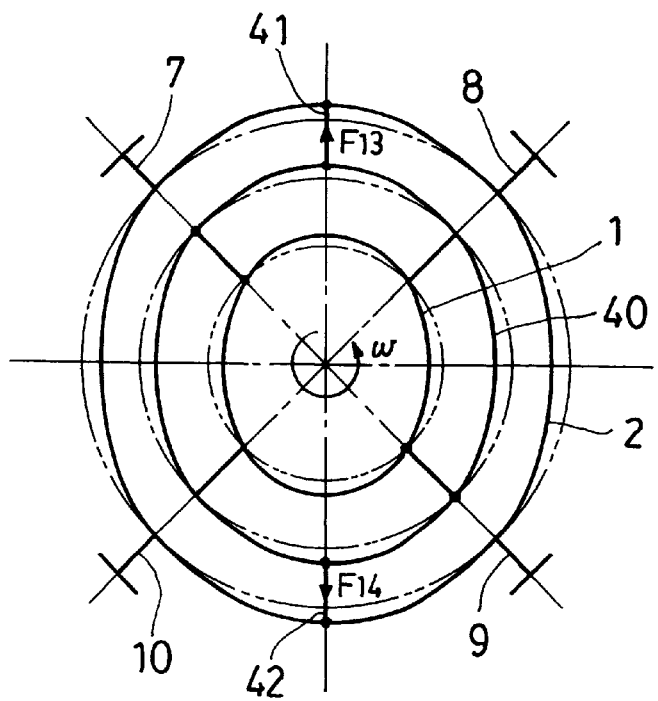

Furthermore, the second vibration element 2 in the outside of the third vibration element 40 receives Coriolis forces F13 and F14, summed in vector through connection portions 41 and 42 as shown in FIG. 12B, and deforms into an ellipse having a vertical long axis.

Since the first vibration element 1 receives maximum stress at this time, the output voltage of the oscillation circuit 21 reaches a maximum. The second vibration element 2 is deformed to generate detecting charge having maximum absolute value of |Qs| on the electrodes 16a to 16d and 18a to 18d for sensing angular velocity. The vibration of the first vibration element 1 is in phase with the second vibration element 2 and the output voltage of the oscillation circuit 21 shown in FIG. 10 is in phase with the output of the sensor circuit 23, a phase-shift circuit for detection becomes unnecessary.

Figure 13A:
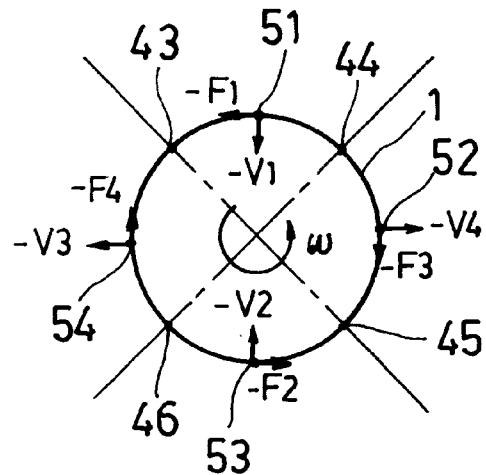
FIG. 13A and FIG. 13B are explanatory views showing a third state of the same as above.

Next, the third state takes place when the shape of the first vibration element 1 shown in FIG. 13A corresponding to FIG. 3C is a perfect circle.

At this time, on the contrary to the state in FIG. 11A, the antinodes of vibration 51 and 53 of the first vibration element 1 vibrate at an inward velocity −V1 and −V2, the antinodes of vibration 52 and 54 vibrate at an outward velocity −V3 and −V4, and the velocities of each oscillation becomes a maximum under this state. The velocity −V1 and −V2 are the same in magnitude and opposite in direction, and the velocity −V3 and −V4 are also the same in magnitude and opposite in direction.

Coriolis forces −F1, −F3, −F2 and −F4 operate on the antinodes of vibration 51, 52, 53 and 54 in the direction perpendicular to the velocity.

The Coriolis forces −F1, −F3, −F2 and −F4 are summed in vector and the summed force works on the nodes of vibration 43, 44, 45 and 46 of the first vibration element 1.

Figure 13B:
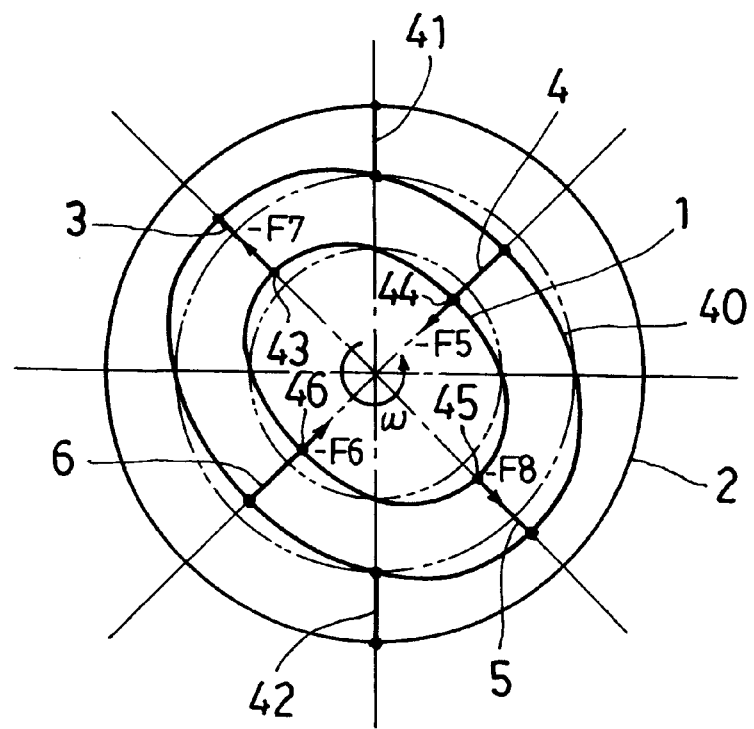

That is, as shown in FIG. 13B, the inward forces −F5 and −F6 exert on the nodes of the vibration 44 and 46, the outward forces −F7 and −F8 exert on the nodes of the vibration 43 and 45, and the first vibration element 1 deforms into an elliptic shape in which a straight line connecting between the nodes 43 and 45 serves as a long axis.

The third vibration element 40 connected to the nodes of vibration 43, 44, 45 and 46 of the first vibration element 1 receives Coriolis forces −F5, −F6, −F7 and −F8 summed together in vector with the first vibration element 1 through the first connection portions 3, 4, 5 and 6, and deforms into an elliptic shape in which the same direction as the first vibration element 1 serves as a long axis.

However, the second vibration element 2 which is connected to the nodes of the third vibration element 40 through the connection portions 41 and 42, does not receive any effect of the vibration, and does not vibrate.

Figure 14A:
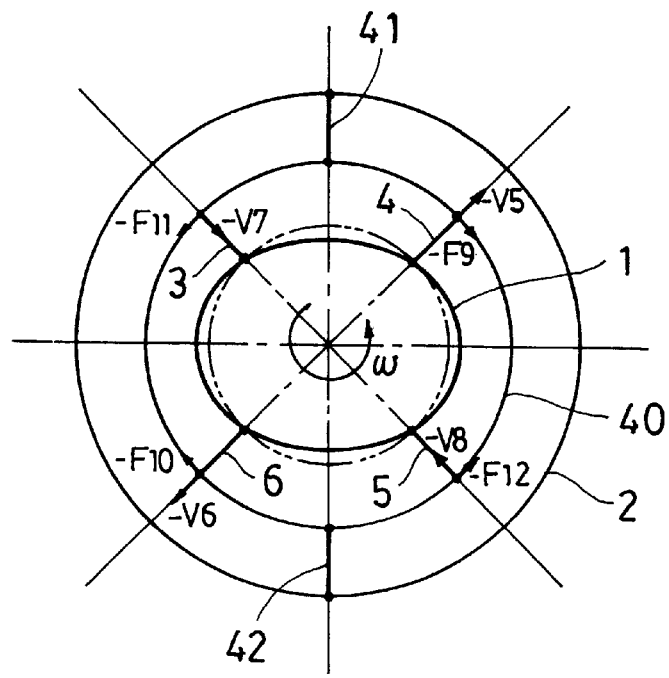
FIG. 14A and FIG. 14B are explanatory views showing a fourth state of the same as above.

Next, in the fourth state, as shown in FIG. 14A, displacement of the first vibration element 1 becomes a maximum in the horizontal direction. At this time, the first connection portions 4 and 6 move at an outward velocity of −V5 and −V6, and the first connection portions 3 and 5 move at an inward velocity −V7 and −V8. The velocity −V5 and the velocity −V6 are the same in magnitude and opposite in direction, and the velocity −V7 and the velocity −V8 are also the same in magnitude and opposite in direction.

The respective portions corresponding to the nodes of vibration of the third vibration element 40 which are connected to the first connection portions move at the same velocity and receive the Coriolis forces −F9, −F10, −F11 and −F12 as shown in FIG. 14A.

Figure 14B:
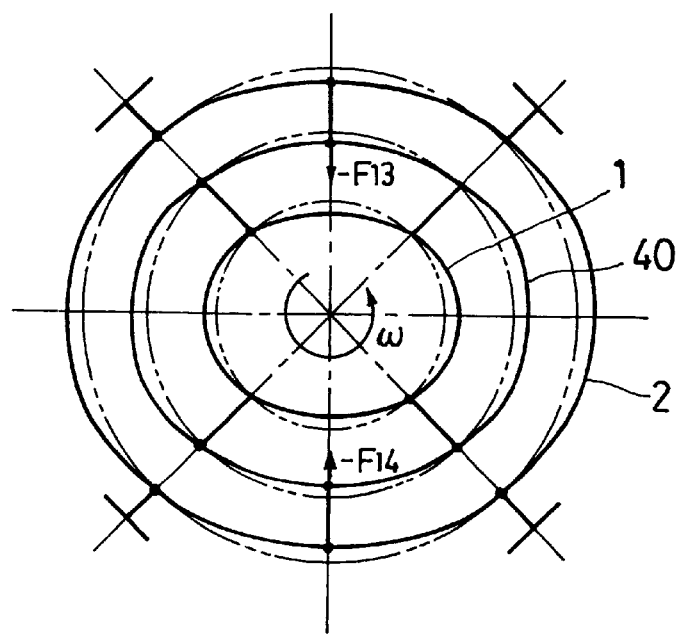
Figure 15:
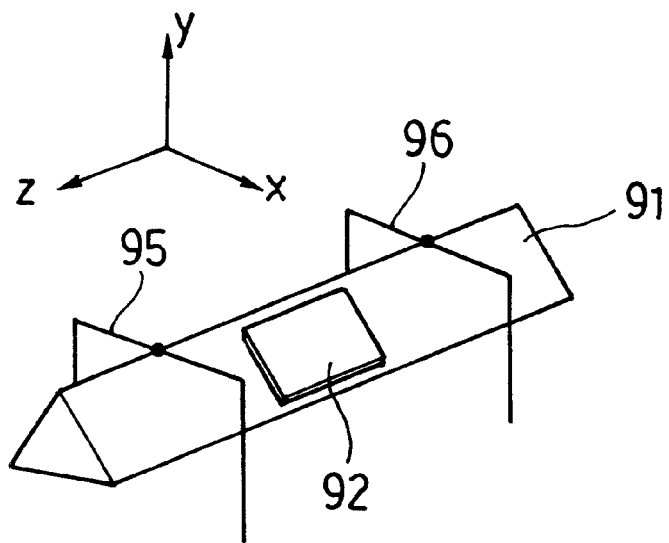
FIG. 15 is a perspective view showing an example of a conventional angular velocity sensing device.
Figure 16:
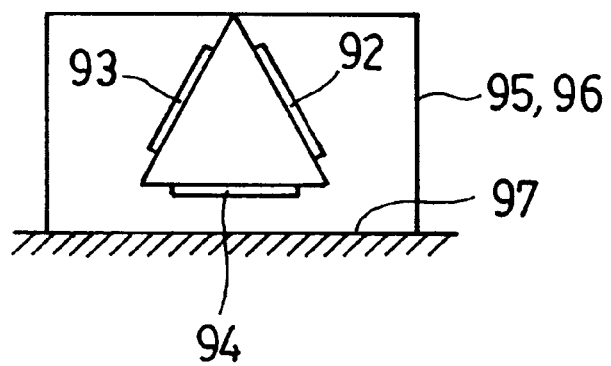
FIG. 16 is a side view of the above conventional angular velocity sensing device.

Furthermore, the second vibration element 2 receives the Coriolis forces −F13 and −F14 summed in vector through the third connection portions 41 and 42 as shown in FIG. 14B, and deforms into an elliptic shape having a horizontal long axis. At this time, the drive voltage has an opposite polarity to the state shown in FIG. 12B and becomes a maximum in magnitude.

When the second vibration element 2 is deformed, a detecting charge having a maximum absolute value of −|Qs| in an opposite polarity to the case shown in FIG. 12B occurs on the electrodes 16a to 16d, and 18a to 18d. Also at this time, the detecting charge is in phase with the output of the oscillation circuit 21.

The detecting charge Qs is given to a first input lead 35 (S1) and a second input lead 38 (S2) of the sensor circuit 23, and is converted to output voltage Es in a trans-impedance circuit in the sensor circuit 23.

The output voltage Es is supplied to a first input of the detector circuit 24, and is detected in synchronization with a second input to which the output of the oscillation circuit 21 is supplied. And the detected voltage becomes a DC output proportional to the angular velocity through the low-pass filter 25.

In the present embodiment, component material for the angular velocity sensing device is not limited to a single crystal quartz Z-plate, other single crystal material having piezo-electricity such as a lithium tantalate single crystal, a lithium borate single crystal, or a silicon substrate, or metallic material can be used. However, when a silicon substrate or metallic material is used, instead of the electrodes for generating oscillation provided on the first vibration element and the electrodes for sensing angular velocity provided on the second vibration element, a piezoelectric element for generating oscillation and a piezoelectric element for sensing angular velocity are provided respectively.

Furthermore, the example in which the first, second, and third vibration elements are formed in a concentric ring-shape is explained, it is not necessarily a round-shaped ring, any shape symmetric with respect to a common center point is acceptable and even a closed-loop shape such as a square, a rectangle, or an ellipse is acceptable.

Effect of Invention

As is evident from the above explanation, since the angular velocity sensing device of the present invention has a plane structure with almost uniform thickness all over the whole angular velocity sensing device and the vibration elements are formed in a symmetric shape with respect to a point, the shock resistance characteristic can be improved.

Additionally, since the whole structure can be integrally formed from the same material by means of chemical treatment such as etching and the like, it becomes unnecessary to weld a supporting member to the vibration element, which makes the assembling process simple and realizes cost reduction.

Furthermore, since the vibration of each vibration element is in-plane vibration perpendicular to the rotational axis of the angular velocity, it becomes possible to make the whole angular velocity sensing device thinner and smaller. Especially when a silicon substrate is used as a component material, since the angular velocity sensing device can be formed on the same substrate with a shape smaller than 1 mm square in a process of making a semiconductor integrated circuit of the oscillation circuit and the sensor circuit, the whole angular velocity sensing system can be made extraordinary smaller.

What is claimed is:

1. An angular velocity sensing device comprising:
    a first vibration element having a piezoelectric element or an electrode for generating oscillation;
    a second vibration element having a piezoelectric element or an electrode for sensing angular velocity;
    a supporting portion;
    first connection portions to connect nodes of vibration of said first vibration element with said second vibration element; and
    second connection portions to connect said second vibration element with said supporting portion,
    wherein said first and second vibration elements, said supporting portion, and said first and second connection portions have a plane structure with almost uniform thickness, and both of said first and second vibration elements have shapes symmetric with respect to a common center point.

2. The angular velocity sensing device according to claim 1, wherein said first vibration element and said second vibration element are formed in a concentric ring-shape.

3. The angular velocity sensing device according to claim 2, wherein said first vibration element is disposed in the inside of said second vibration element, and said supporting portion is disposed in the outside of said second vibration element.

4. The angular velocity sensing device according to claim 2, wherein said first vibration element is disposed in the outside of said second vibration element and said supporting portion is disposed in the inside of said second vibration element.

5. The angular velocity sensing device according to claim 1, wherein said first and second vibration elements are formed from metal or silicon.

6. The angular velocity sensing device according to claim 1, wherein said first and second vibration elements are formed from a single crystal having piezo-electricity.

7. The angular velocity sensing device according to claim 6, wherein said single crystal having the piezo-electricity is any one of a quartz single crystal, a lithium tantalate single crystal and a lithium borate single crystal.

8. The angular velocity sensing device according to claim 1, wherein said first, second vibration elements, said supporting portion, and said first and second connection portions are integrally formed with the same material.

9. The angular velocity sensing device according to claim 6, wherein said first vibration element is a ring-shaped vibration element having electrodes for generating oscillation on the portions of antinode of the vibration, and said second vibration element is a ring-shaped vibration element having electrodes for sensing angular velocity at the positions corresponding to the electrodes for generating oscillation of said first vibration element.

10. The angular velocity sensing device according to claim 9, wherein said ring-shaped first vibration element, second vibration element, said first and second connection portions, and said supporting portion are integrally formed with a single crystal having piezo-electricity.

11. An angular velocity sensing device, comprising:
    a first vibration element having a piezoelectric element or an electrode for generating oscillation;
    a second vibration element having a piezoelectric element or an electrode for sensing angular velocity;
    a third vibration element;
    a supporting portion to support said first vibration element or said second vibration element;
    connection portions to connect nodes of vibration of said first vibration element with said third vibration element; and
    connection portions to connect said third vibration element with said second vibration element,
    wherein said first, second, and third vibration elements, said supporting portion, and each of said connection portions form a plane structure with almost uniform thickness and each of said first, second, third vibration elements have a shape symmetric with respect to a common center point.

12. The angular velocity sensing device according to claim 11, wherein said first, second, third vibration elements, said supporting portion, and said first and second connection portions are integrally formed with the same material, and each of said first, second, and third vibration elements is formed in a concentric ring-shape.

13. The angular velocity sensing device according to claim 12, wherein said first, second and third vibration elements, said supporting portion, and said first and second connection portions are integrally formed with a single crystal quartz Z-plate;

wherein said first vibration element is a ring-shaped vibration element having said electrodes for generating the oscillation on positions symmetric with respect to the Y-axis of said single crystal quartz Z-plate; and wherein said second vibration element is a ring-shaped vibration element having said electrodes for sensing the angular velocity on positions symmetric with respect to the Y-axis of said single crystal quartz Z-plate.

* * * * *